(12) United States Patent
Blankenbeckler et al.

(10) Patent No.: US 11,606,214 B2
(45) Date of Patent: Mar. 14, 2023

(54) DECRYPTION AND VARIANT PROCESSING

(71) Applicant: Western Digital Technologies, Inc., San Jose, CA (US)

(72) Inventors: David Blankenbeckler, Longmont, CO (US); Nikola Kolarovic, Novi Sad (RS); Ninoslav Zmukic, Novi Sad (RS); Tihomir Andjelic, Novi Sad (RS)

(73) Assignee: Western Digital Technologies, Inc., San Jose, CA (US)

( * ) Notice: Subject to any disclaimer, the term of this patent is extended or adjusted under 35 U.S.C. 154(b) by 59 days.

(21) Appl. No.: 17/160,263

(22) Filed: Jan. 27, 2021

(65) Prior Publication Data
US 2021/0184861 A1 Jun. 17, 2021

Related U.S. Application Data

(62) Division of application No. 15/801,037, filed on Nov. 1, 2017, now Pat. No. 10,944,572.

(Continued)

(51) Int. Cl.
*H04L 9/32* (2006.01)
*H04N 19/00* (2014.01)
(Continued)

(52) U.S. Cl.
CPC ............. *H04L 9/3247* (2013.01); *G06F 9/46* (2013.01); *G06F 12/1408* (2013.01);
(Continued)

(58) Field of Classification Search
CPC ... H04L 9/3247; H04L 9/0618; H04L 9/0897; H04L 9/3268; H04L 63/0428;
(Continued)

(56) References Cited

U.S. PATENT DOCUMENTS 6,398,246 B1 ‡ 6/2002 Okajima ................ A63C 10/24
280/263
9,100,693 B2 * 8/2015 Vembu ............... H04N 21/4405
(Continued)

FOREIGN PATENT DOCUMENTS

WO 2000045273 A9 8/2000
WO WO-2000045273 A9 ‡ 8/2000

OTHER PUBLICATIONS

International Search Report and Written Opinion, dated Apr. 19, 2018, from counterpart International Application No. PCT/US2017/068374,10 pages.‡

(Continued)

*Primary Examiner* — Dereena T Cattungal
(74) *Attorney, Agent, or Firm* — Barry IP Law, P.C.

(57) ABSTRACT

A plurality of byte ranges forms a sample for content output from a player device, and includes at least one double-encrypted byte range. The plurality of byte ranges is stored in a secured memory, and the at least one double-encrypted byte range is partially decrypted to generate at least one decrypted singe-encrypted byte range. The plurality of byte ranges is stored in an unsecured memory using the at least one decrypted single-encrypted byte range in place of the at least one double-encrypted byte range.

20 Claims, 8 Drawing Sheets

Related U.S. Application Data

(60) Provisional application No. 62/441,511, filed on Jan. 2, 2017.

(51) Int. Cl.

| | | |
|---|---|---|
| *G06F 12/14* | (2006.01) | |
| *G06F 21/72* | (2013.01) | |
| *G06F 9/46* | (2006.01) | |
| *H04N 21/4627* | (2011.01) | |
| *H04L 9/06* | (2006.01) | |
| *H04L 9/40* | (2022.01) | |
| *H04N 21/443* | (2011.01) | |
| *H04L 9/08* | (2006.01) | |
| *H04N 19/467* | (2014.01) | |
| *H04N 21/488* | (2011.01) | |
| *H04N 21/4405* | (2011.01) | |
| *H04N 21/434* | (2011.01) | |
| *H04N 21/433* | (2011.01) | |
| *G06F 21/60* | (2013.01) | |
| *H04N 19/436* | (2014.01) | |
| *G06F 21/10* | (2013.01) | |
| *G06F 21/62* | (2013.01) | |

(52) U.S. Cl.
CPC ............ *G06F 21/10* (2013.01); *G06F 21/602* (2013.01); *G06F 21/6218* (2013.01); *G06F 21/72* (2013.01); *H04L 9/0618* (2013.01); *H04L 9/0897* (2013.01); *H04L 9/3268* (2013.01); *H04L 63/0428* (2013.01); *H04L 63/10* (2013.01); *H04L 63/164* (2013.01); *H04N 19/00* (2013.01); *H04N 19/436* (2014.11); *H04N 19/467* (2014.11); *H04N 21/4334* (2013.01); *H04N 21/4344* (2013.01); *H04N 21/4405* (2013.01); *H04N 21/4435* (2013.01); *H04N 21/4627* (2013.01); *H04N 21/4884* (2013.01); *G06F 12/1441* (2013.01); *G06F 2212/1052* (2013.01); *G06F 2221/0733* (2013.01); *G06F 2221/2107* (2013.01); *H04L 2209/603* (2013.01); *H04L 2209/608* (2013.01)

(58) Field of Classification Search
CPC . H04L 63/10; H04L 63/164; H04L 2209/603; H04L 2209/608; G06F 9/46; G06F 12/1408; G06F 21/10; G06F 21/602; G06F 21/6218; G06F 21/72; G06F 12/1441; G06F 2212/1052; G06F 2221/0733; G06F 2221/2107; H04N 19/00; H04N 19/436; H04N 19/467; H04N 21/4334; H04N 21/4344; H04N 21/4405; H04N 21/4435; H04N 21/4627; H04N 21/4884

USPC ......................................................... 713/176
See application file for complete search history.

(56) References Cited

U.S. PATENT DOCUMENTS

| | | | |
|---|---|---|---|
| 10,402,566 B2 ‡ | 9/2019 | Kibalo | G06F 21/575 |
| 10,565,354 B2 ‡ | 2/2020 | Ray | G06F 9/455 |
| 11,184,331 B1 * | 11/2021 | Berg | H04N 21/41407 |
| 2002/0104003 A1 ‡ | 8/2002 | Iwamura | G06T 1/0028 |
| | | | 713/176 |
| 2004/0010802 A1 * | 1/2004 | Visharam | H04N 21/4381 |
| | | | 375/E7.025 |
| 2005/0251491 A1 ‡ | 11/2005 | Medina | G06Q 20/3829 |
| | | | 705/71 |
| 2006/0062426 A1 * | 3/2006 | Levy | H04N 21/8358 |
| | | | 348/E7.071 |
| 2007/0198858 A1 ‡ | 8/2007 | Kim | H04N 21/4345 |
| | | | 713/193 |
| 2009/0097644 A1 * | 4/2009 | Haruki | G11B 20/00492 |
| | | | 707/999.001 |
| 2011/0069222 A1 ‡ | 3/2011 | Wajs | H04N 21/4181 |
| | | | 348/42 |
| 2012/0089843 A1 ‡ | 4/2012 | Kato | G06F 21/10 |
| | | | 713/176 |
| 2012/0131606 A1 * | 5/2012 | Lejeune | H04N 21/4405 |
| | | | 348/553 |
| 2014/0059357 A1 * | 2/2014 | Andersson | G06F 21/602 |
| | | | 713/189 |
| 2014/0068260 A1 ‡ | 3/2014 | Oney | H04L 63/0457 |
| | | | 713/168 |
| 2014/0161196 A1 ‡ | 6/2014 | Culebro | H04N 21/440218 |
| | | | 375/240.26 |
| 2014/0233740 A1 * | 8/2014 | Niamut | H04L 9/3013 |
| | | | 380/279 |
| 2014/0281481 A1 ‡ | 9/2014 | Moroney | H04L 63/0457 |
| | | | 713/151 |
| 2014/0282687 A1 ‡ | 9/2014 | Kummer | H04N 21/2541 |
| | | | 725/31 |
| 2016/0070887 A1 * | 3/2016 | Wu | G06F 21/74 |
| | | | 713/189 |
| 2016/0171186 A1 ‡ | 6/2016 | Marking | H04L 9/0861 |
| | | | 713/190 |
| 2017/0023755 A1 ‡ | 8/2017 | Van Foreest | H04L 9/002 |
| | | | 713/18 |
| 2017/0237551 A1 | 8/2017 | Foreest et al. | |

OTHER PUBLICATIONS

Pending U.S. Appl. No. 15/801,037, filed Nov. 1, 2017, entitled "Decryption and Variant Processing", David Blankenbeckler et al.

\* cited by examiner
‡ imported from a related application

DECRYPTION AND VARIANT PROCESSING

CROSS-REFERENCE TO RELATED APPLICATIONS

This application is a divisional application of U.S. patent application Ser. No. 15/801,037, entitled "DECRYPTION AND VARIANT PROCESSING", and filed on Nov. 1, 2017, which is hereby incorporated by reference in its entirety. This application also claims the benefit of U.S. Provisional Application No. 62/441,511, entitled "DECRYPTION AND VARIANT PROCESSING", and filed on Jan. 2, 2017, which is hereby incorporated by reference in its entirety.

BACKGROUND

An increasing amount of content such as movies and music are being distributed electronically. Various forms of Digital Rights Management (DRM), such as encryption, can be used to help prevent unauthorized distribution of content. In addition, digital watermarking may be used to uniquely identify a source of the content. Such digital watermarking may, for example, be used for forensic purposes in identifying the source of pirated content.

As media content file sizes become larger due to improved video formats such as 4K and 8K Ultra High Definition (UHD) and improved audio formats, the processing and memory resources needed for DRM or digital watermarking becomes significantly larger. The larger content file sizes result in a higher bit rate requirement for seamless playback, which can be affected by the consumption of processing or memory resources for real time decryption or digital watermarking at the decoding device. In addition, decryption or digital watermarking may need to be performed by secured memories or secured processors that add to the cost and complexity of the decoding device.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Overview

Figure 1:
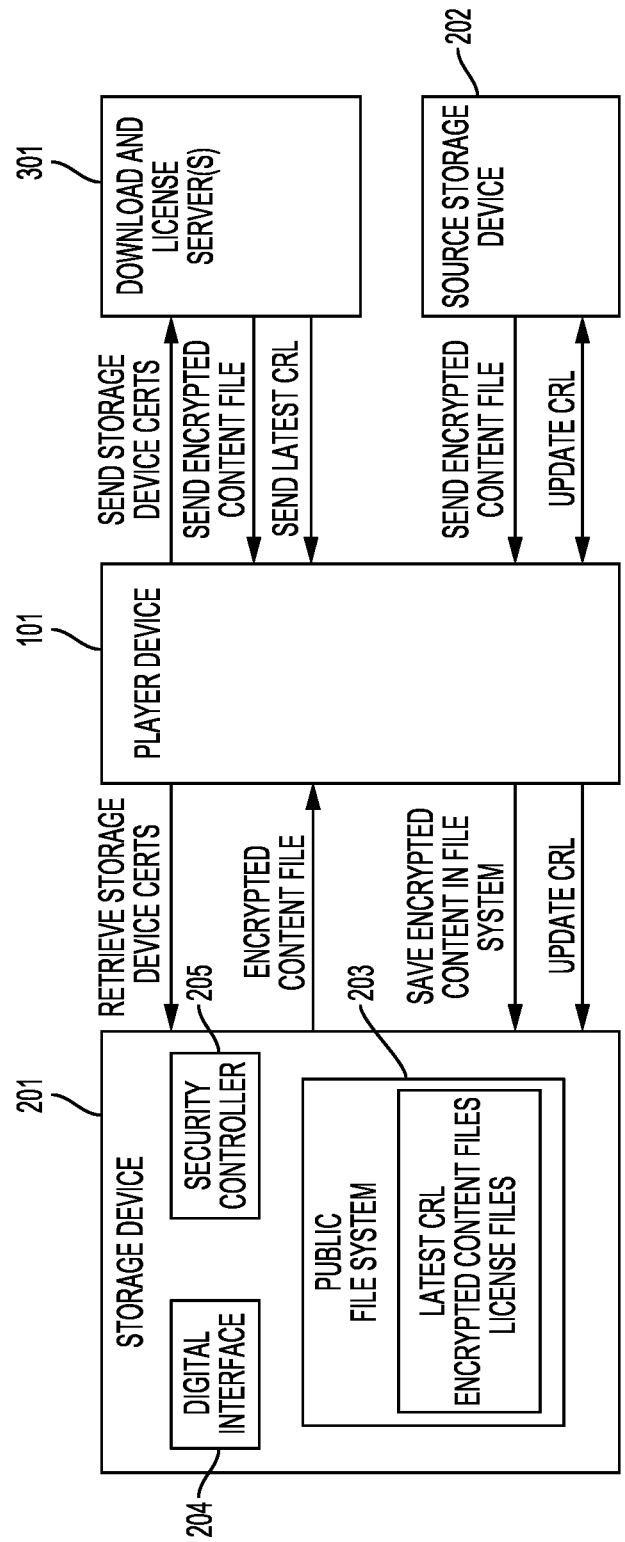
FIG. 1 is a block diagram of an encrypted content delivery system according to an embodiment.

FIG. 1 shows an example of a content delivery system according to an embodiment. As shown in FIG. 1, the content delivery system includes download and license server or servers 301, player device 101, and storage devices 201 and 202. Storage devices 201 and 202 may include, for example, a Secure Digital (SD) flash card, Universal Serial Bus (USB) drive, a Hard Disk Drive (HDD), a Solid-State Drive (SSD), or a hybrid drive including both rotating magnetic storage media and solid-state storage media. Player device 101 may include, for example, a set-top-box, DVD player, dongle device, PC, tablet, laptop, or a smartphone. In some implementations, storage device 201 or 202 may be included with player device 101 as a single device. In other implementations, player device 101, storage device 201, and/or storage device 202 may not be physically co-located.

Those of ordinary skill in the art will appreciate that other embodiments can include more or less than those elements shown in FIG. 1 and that the disclosed processes can be implemented in other environments with different configurations. For example, other embodiments can include a different number of storage devices and player devices. In other examples, the content delivery system may not include download and license server or servers 301. In such an example, content may come from a removable storage medium, such as an optical disc (e.g., Blu-ray disc) or from another device such as storage device 202.

As shown in the example of FIG. 1, storage device 201 is connected to player device 101, which may act as a conduit device to save encrypted content in public file system 203 of storage device 201. The encrypted content may, for example, be encrypted using a symmetric encryption such as Advanced Encryption Standard (AES) in a Common File Format (CFF).

The conduit device in FIG. 1 is player device 101, but in other implementations, the conduit device can be a kiosk, a PC, or a download server, for example. As the conduit device, player device 101 receives a latest Certificate Revision List (CRL) and encrypted content files from download and license server or servers 301. In some implementations, the download server and the license server may be separate so that player device 101 receives the encrypted content files from the download server, and receives the latest CRL and/or licenses for accessing the content files from a separate license server.

As noted above, the source of the data can, for example, be an internet download, a super-distribution system, or a software application that copies the content files from another storage device. License files, a CRL, and license keys may also be downloaded for authorizing access to the encrypted content files. The license files, a latest CRL, and license keys may be received by storage device 201 from download and license server(s) 301 via player device 101 using, for example, a secure session that may begin with a public key handshake between storage device 201 and download and license server(s) 301. In implementations where a separate server is used as a license server, player device 101 may only connect to the license server.

As shown in the example of FIG. 1, the encrypted content files, a latest CRL, and licenses are stored in public file system 203 of storage device 201. In some implementations, the latest CRL and license files for playing the content files may be cryptographically signed to detect unauthorized modification. In other implementations, the CRL and license files may be encrypted to protect against unauthorized use. The CRL can allow certificates for playing the content files, or for playing the content files at a certain quality level (e.g., UHD versus standard definition), to be confirmed, overridden, or revoked. In one implementation, a storage device (e.g., storage device 201 or 202) must have the same CRL version as player device 101 in order to play content. As an additional security measure, some implementations may require that license files and license keys are stored on the same storage device as the content file in order to play content.

Storage device 201 may store keys in security controller 205 that are also used when obtaining license files from download and license server(s) 301 or when preparing content files for playback using player device 101. Security controller 205 can include circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor 102 can include a System On a Chip (SoC). Security controller 205 can include a tamper-resistant computation environment with internal storage for keys that are kept separate from public file system 203. Such keys can include, for example, a storage device base key, a storage device private key or certification, a public key for communicating with download and license server(s) 301, and license keys for use with the encrypted license files stored in public file system 203.

Digital interface 204 provides an interface for communicating with player device 101. Digital interface 204 may use, for example, a bus or network, and may interface with player device 101 using, for example, Ethernet or WiFi, or a bus standard such as Serial Advanced Technology Attachment (SATA), PCI express (PCIe), Small Computer System Interface (SCSI), or Serial Attached SCSI (SAS). In some implementations, playing encrypted content files may require player device 101 to connect to storage device 201 to establish a secure session. This may begin with a public key handshake between player device 101 and storage device 201. Storage device 201 may then verify certificates for playing the requested content file.

In one example, each of storage device 201 and player device 101 may derive their own shadow or intermediate keys using secured keys that are specific to the device and license keys. A license file for a requested content file may then be used to perform a series of operations using the derived shadow keys at each of storage device 201 and at player device 101. After all of the operations have been performed, a playback map or other data structure can be stored in a memory of player device 101. This data structure can include a list of offset ranges in the encrypted content file, a list of decryption keys for each range, and additional processing instructions for playback of the content file. As will be appreciated by those of ordinary skill in the art, other methods for preparing player device 101 for the decryption and processing of content files may be used in other examples.

Figure 2:
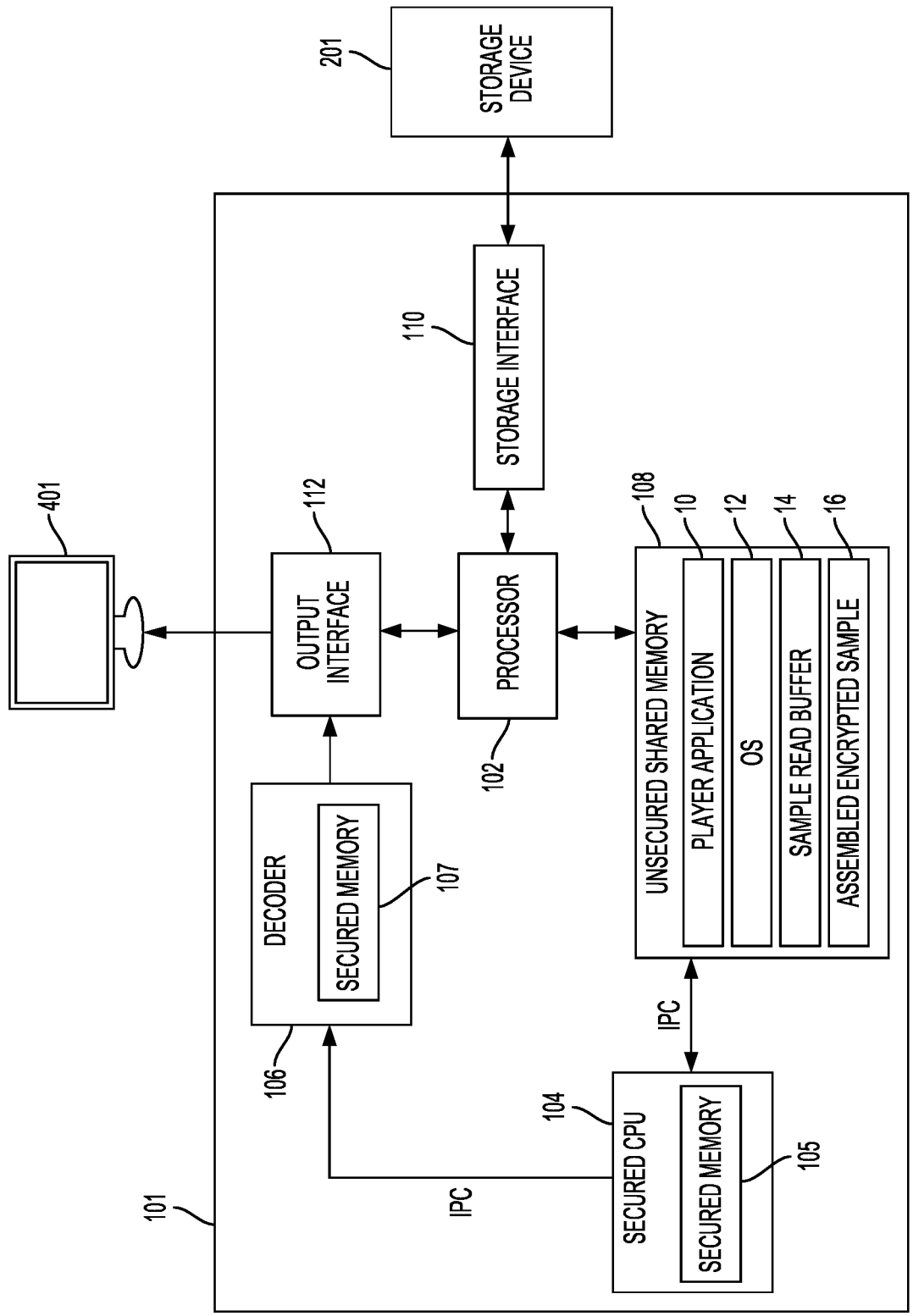
FIG. 2 is a block diagram of a player device according to an embodiment.

FIG. 2 is a block diagram of player device 101 according to an embodiment. As shown in FIG. 2, player device 101 communicates with storage device 201 to obtain encrypted content files via storage interface 110. Storage interface 110 is configured to interface player device 101 via a bus or network, and may interface using, for example, Ethernet or WiFi, or a bus standard such as SATA, PCIe, SCSI, or SAS.

As shown in FIG. 2, player device 101 includes unsecured processor 102, which includes circuitry such as one or more processors for executing instructions and can include a microcontroller, DSP, ASIC, FPGA, hard-wired logic, analog circuitry and/or a combination thereof. In some implementations, processor 102 can include an SoC.

Processor 102 also communicates with output interface 112, which can provide video and/or audio data to display device 401. Output interface 112 may interface using, for example, High Definition Multimedia Interface (HDMI), DisplayPort, Ethernet, or WiFi. In some implementations, player device 101 and display device 401 may be integrated into one device.

Unsecured shared memory 108 is configured to store player application 10, Operating System (OS) 12, sample read buffer 14, and assembled encrypted sample 16. Those of ordinary skill in the art will also appreciate that other embodiments may include more or less than all of the items depicted as being stored in memory 108. Memory 108 can represent a volatile memory of player device 101, such as Dynamic Random Access Memory (DRAM), for temporarily storing data used by processor 102, secured CPU 104, and decoder 106. In other embodiments, memory 108 can be a Non-Volatile Memory (NVM), such as Magnetoresistive Random Access Memory (MRAM).

As discussed in more detail below, player application 10 includes computer-executable instructions for operating player device 101 and providing a user interface to display device 401 via output interface 112. OS 12 can manage hardware and software resources of player device 101 and can include, for example, a Linux OS, Android OS, Windows OS, Mac OS, or a customized OS. Hardware resources managed by application OS 12 can include, for example, storage interface 110, output interface 112, unsecured shared memory 108, secured Central Processing Unit (CPU) 104, and decoder 106. Software resources managed by application OS 12 can include, for example, one or more file systems, drivers for interfacing with display device 401 and storage device 201, and applications such as player application 10.

Sample read buffer 14 includes a portion of memory 108 for storing samples and variant samples of encrypted content files received from storage device 201 for processing by secured CPU 104. As discussed below with reference to the examples of FIGS. 5 to 7B, assembled encrypted sample 16 can include a plurality of video data byte ranges that have been ordered by secured CPU 104 and includes at least one encrypted byte range. In other implementations, assembled encrypted sample 16 can correspond to audio data byte ranges instead of video data byte ranges.

As with processor 102, secured CPU 104 can include circuitry such as one or more processors for executing instructions and can include a microcontroller, a DSP, an ASIC, an FPGA, hard-wired logic, analog circuitry and/or a combination thereof. In some implementations, secured CPU 104 can include an SoC with secured memory 105.

Secured CPU 104 and secured memory 105 are protected from access with a higher level of security than processor 102 and shared memory 108. Secured CPU 104 may be protected by limiting the memories that it can utilize, the functions it can perform, and/or the programming that can be performed to its firmware. Secured memory 105 may be similarly protected by limiting the components that may access secured memory 105. These protections for secured memory 105 and secured CPU 104 may be implemented, for example, by requiring authentication or restricting access by or to particular components.

In some implementations, secured memory 105 may store a playback map or other data structure generated by secured CPU 104 using shadow keys or intermediate keys based on the encrypted files. The playback map can include keys associated with Key Identifiers (KIDs). The keys in the playback map can include, for example, AES audio keys, metadata keys, common audio and video keys, byte range keys, or video keys used for AES decryption in counter mode. As discussed below in more detail, some of these keys may be special byte range keys used to decrypt a particular byte range of a video sample before decrypting the full sample with a common video key. Such double decryption can, for example, provide additional security for particular byte ranges of variant sample data that serve as digital watermarks when the content is played on display device 401.

Sample data including a plurality of byte ranges stored in sample read buffer 14 are forwarded to secured CPU 104 for variant processing or decryption. The sample data may be forwarded to secured CPU 104 via an Inter-Process Communication (IPC) call on a secure audio/video path. As discussed below with reference to FIGS. 3 to 7B, secured CPU 104 may use secured memory 105 for decrypting byte ranges. In some cases, secured CPU 104 may also use secured memory 105 for ordering byte ranges or partially decrypting double encrypted byte ranges. The ordering of byte ranges may be performed, for example, to provide a digital watermark or to provide for an additional level of security. A plurality of byte ranges may form a variant sample for providing a digital watermark in content output from player device 101.

In some implementations, the ordering of byte ranges for a video sample may be triggered when there is a time-parallel variant or substitute sample available in the content file or when the main or base video sample cannot otherwise be decrypted, such as when a key is not available in the playback map for a particular sample or byte range. After ordering the byte ranges, the ordered byte ranges are stored in unsecured memory 108 as assembled encrypted sample 16 for further processing by unsecured processor 102. After the additional processing performed by unsecured processor 102, assembled encrypted sample 16 is then decrypted by secured CPU 104 before being decoded by decoder 106 using secured memory 107.

In cases where unsecured processor 102 determines that the byte ranges in a sample do not need to be ordered, such as when the base sample has a key or when there is no variant sample, secured CPU 104 may access assembled encrypted sample 16 from unsecured memory 108 and proceed to full decryption of the sample without ordering the byte ranges and returning the ordered byte ranges to unsecured memory 108.

By using unsecured shared memory 108 to store assembled encrypted sample 16, it is ordinarily possible to reduce the size needed for secured memory 105 for processing samples. Assembled encrypted sample 16 remains protected in unsecured memory 108 since it is still encrypted. In addition, the use of unsecured memory 108 to store assembled encrypted sample 16 can also improve the performance of player device 101 during decryption and decoding of an encrypted file. By storing assembled encrypted sample 16 in unsecured memory 108, both secured CPU 104 and unsecured processor 102 are able to perform secured and unsecured operations, respectively, on the sample. This can ordinarily improve real time decryption and decoding of large encrypted files at high bit rates without having to increase the secured processing and secured memory resources of player device 101. In this regard, secured memory and secured processors are generally more expensive than unsecured memory and unsecured processors and generally must be dedicated to only performing secured operations.

In the example of FIG. 2, decoder 106 is a secured processor that includes circuitry to decode a fully decrypted version of assembled sample 16 using secured memory 107. Decoder 106 accesses secured memory 105 via an IPC call on a secure audio/video path to retrieve the decrypted sample for decoding. Decoder 106 may decode samples, such as video samples, using a standard such as the High Efficiency Video Coding (HEVC) (i.e., H.265) standard or the MPEG-4 Advanced Video Coding (AVC) (i.e., H.264) standard. The decoded sample is then provided to output interface 112 for output to display device 401.

As with processor 102, decoder 106 can include circuitry such as one or more processors for executing instructions and can include a microcontroller, a DSP, an ASIC, an FPGA, hard-wired logic, analog circuitry and/or a combination thereof. In some implementations, decoder 106 can include an SoC with secured memory 107.

Decoder 106 and secured memory 107 are protected from access with a higher level of security than unsecured processor 102 and unsecured memory 108. Decoder 106 may be protected by limiting the memories that it can utilize, the functions it can perform, and/or the programming that can be performed to its firmware. Secured memory 107 may be similarly protected by limiting the components that may access secured memory 107. These protections for secured memory 107 and decoder 106 may be implemented, for example, by requiring authentication or restricting access by or to particular components.

Decryption and Variant Processing Examples

Figure 3:
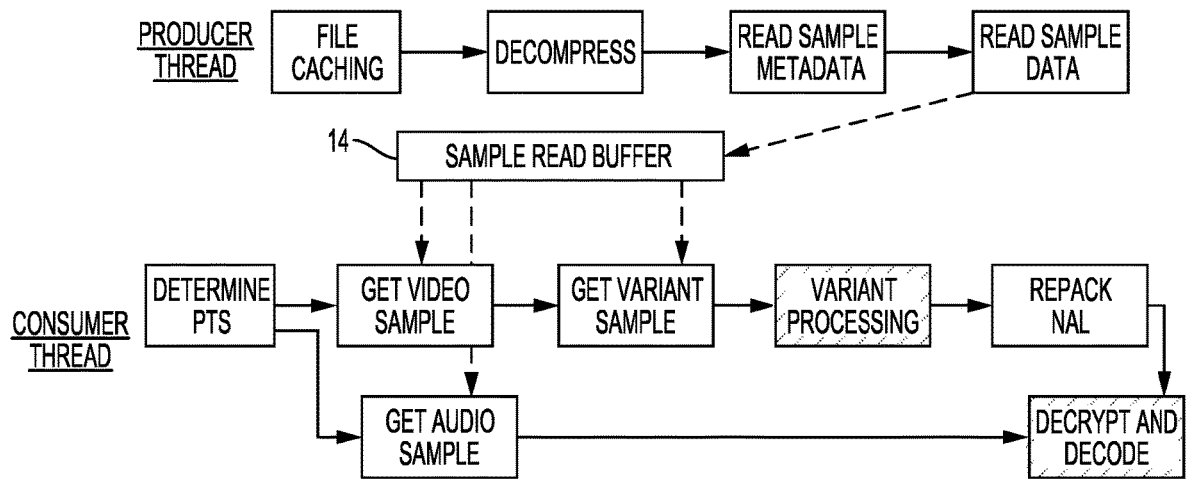
FIG. 3 is a parallel thread implementation for demultiplexing, decrypting, and decoding content according to an embodiment.

FIG. 3 is a parallel thread implementation for demultiplexing, decrypting, and decoding content according to an embodiment. As shown in FIG. 3, the processing of samples can be performed by a producer thread and a consumer thread. This parallel processing can ordinarily improve the performance of player device 101 in demultiplexing, decryption, and decoding large files at high bit rates in real time.

In the example of FIG. 3, unsecured processor 102 may perform all of the stages of the producer thread, and most of the stages of the consumer thread, with certain stages of the consumer thread executed by secured CPU 104 and decoder 106. In addition to improving the processing time of samples by allocating the stages among unsecured processor 102, secured CPU 104, and decoder 106, most of the stages are performed by unsecured processor 102 with access to unsecured memory 108. This ordinarily requires the use of less secured memory and secured processing as compared to performing all or most of the stages in FIG. 3 using a secured processor and a secured memory.

As shown with the cross-hatching in the example of FIG. 3, secured memory and secured processors are only used for the variant processing stage and the decrypt and decode stage of the consumer thread. Secured CPU 104 executes the variant processing stage and the decryption portion of the decrypt and decode stage. Decoder 106 performs the decoding portion of the decrypt and decode stage. The remaining stages of the consumer thread are performed by unsecured processor 102.

The producer thread executed by unsecured processor 102 reads audio, video, and variant packets, and extracts metadata from an encrypted content file. The metadata can include encryption parameters such as format parameters (e.g., MPEG-Common Encryption (CENC) parameters) used for decrypting the sample data. As shown in FIG. 3, encrypted files are processed by the producer thread by caching and decompressing the files, or portions of the files. The encrypted content files may, for example, be received from storage device 201 via storage interface 110 and buffered in unsecured memory 108. The producer thread performs further processing by reading sample metadata and sample data included in the encrypted files, and storing them in sample read buffer 14. As discussed below, in implementations using digital watermarking, the producer thread may also read a matching variant sample for some or all video samples, which may be included in an auxiliary track in the file.

Figure 5:
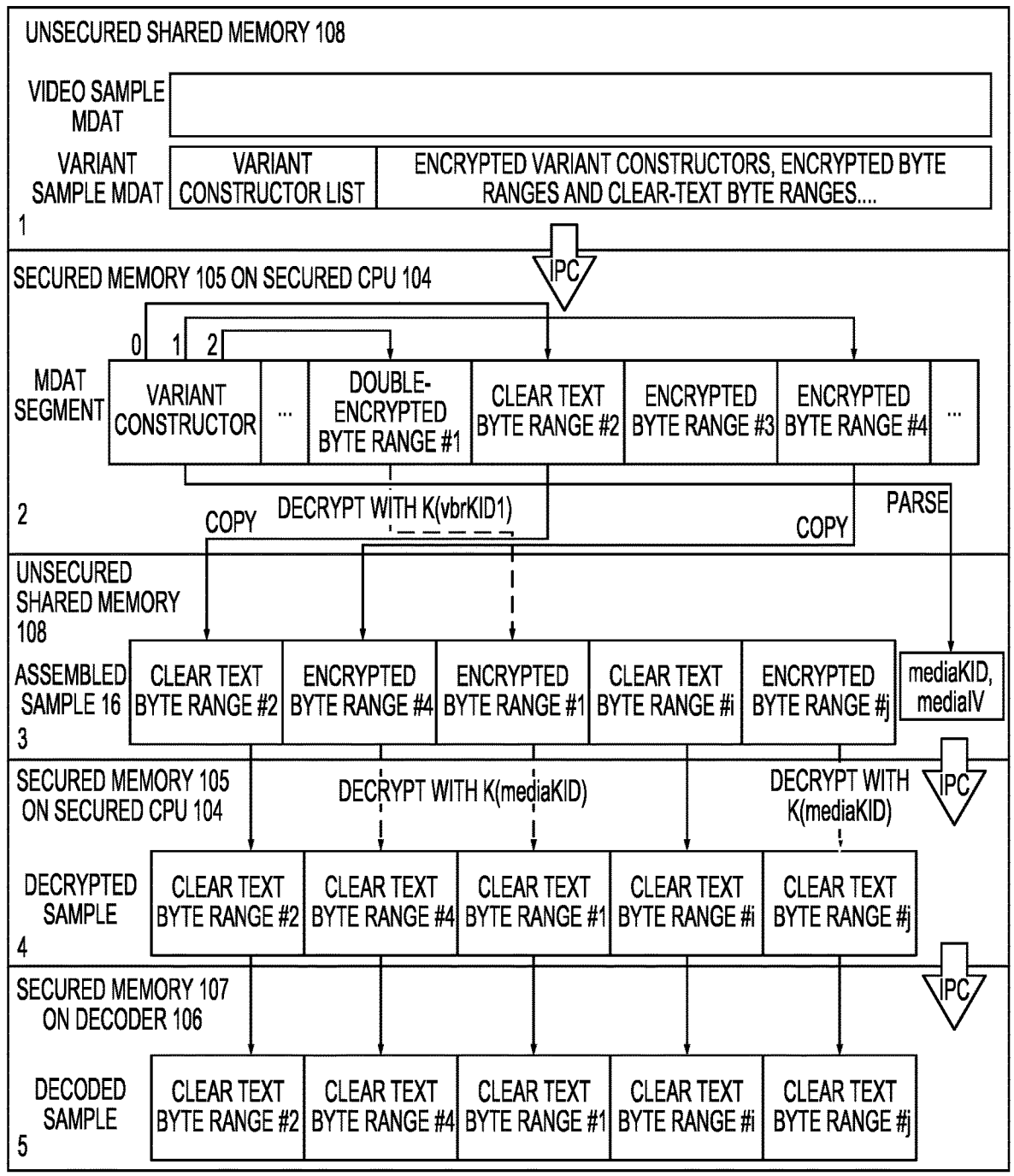
FIG. 5 is an example data flow for the decryption of a video sample with a variant sample according to an embodiment.
Figure 6A:
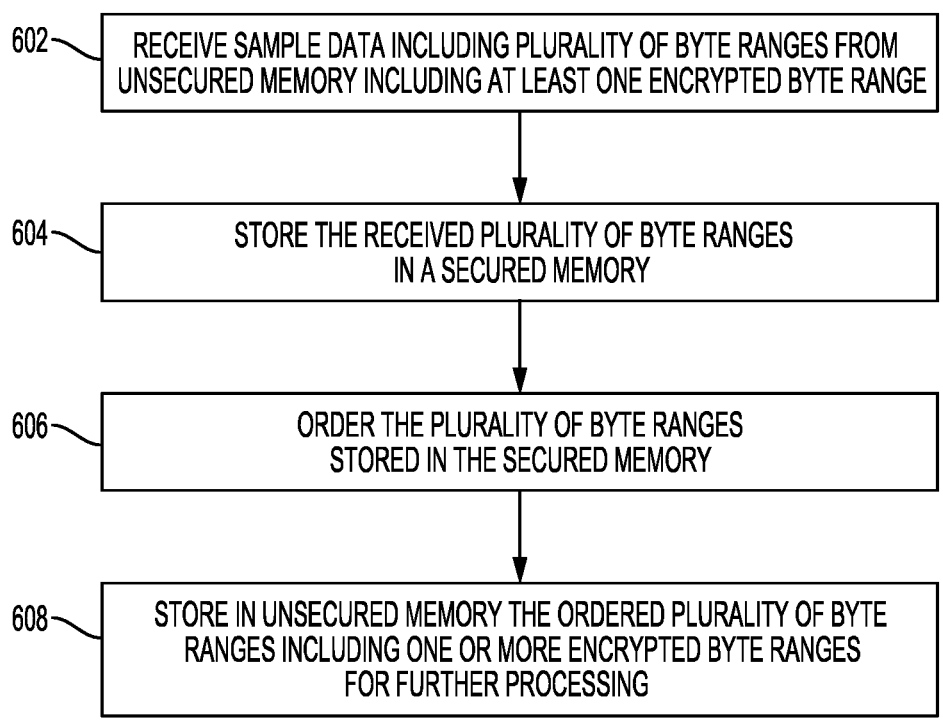
FIG. 6A is a flowchart for a variant sample process according to an embodiment.

The consumer thread retrieves video and audio samples from sample read buffer 14. Video and audio samples can be retrieved by unsecured processor 102 in Presentation Time-Stamp (PTS) order as determined by unsecured processor 102. In some implementations, if a key for decoding a byte range from the video sample is not accessible, then variant processing as discussed below for FIGS. 5 and 6A is performed, which may substitute a matching PTS (i.e., time-parallel) variant sample for a base sample to digitally watermark the content. In other implementations, variant processing may be performed under other conditions, such as only if a variant sample is available. In the example of FIG. 3, unsecured processor 102 obtains the variant sample and passes the variant sample to secured CPU 104 for variant processing.

The use of a variant sample can provide for forensic marking or digital watermarking of the content output from player device 101. In one implementation, a content provider may include different possible variant samples for different player devices such that each copy of the decrypted content file may uniquely identify the player device that decrypted and decoded the content file and/or the storage device that stored the content file. In some implementations, information such as a date and time when the content was played can be encoded into the digital watermark for forensic analysis. For example, the use of a key uniquely assigned to a player device may allow the player device to process only one corresponding variant sample or set of variant samples from among many variant samples included in the content file. Unauthorized copies of the content file may then be traced to the player device by identifying digital watermarks such as visual indicators in the unauthorized copy. An updated CRL at download and license server(s) 301 in FIG. 1 may then allow for the revocation or revision of the player device so that the player device can no longer decrypt content files.

In one example, a playback map generated for a particular player device using a serial number of the player device and/or a storage device serial number may not include KIDs and keys for certain video sample data byte ranges. The byte ranges without keys may depend on the player device and/or the storage device used. The substituted variant byte range may include, for example, data that briefly provides a visual indicator in certain frames of the rendered content.

After variant processing (if any), secured CPU 104 returns the sample to unsecured memory 108 as assembled encrypted sample 16. Unsecured processor 102 continues the consumer thread processing by performing sample Network Abstraction Layer (NAL) repacking to Annex B format. Unsecured processor 102 then feeds the sample payload (assembled encrypted sample 16 including decryption and decoding parameters) to secured memory 105 for decryption by secured CPU 104 and decoding by decoder 106. The decryption and decoding parameters included with assembled encrypted sample 16 can include metadata, such as, for example, a keyframe flag, PTS, and sample duration.

In addition to the improvements in processing discussed above, the use of parallel threads and multiple processors and memories can also better facilitate random access for playback seek and trick modes, such as fast forward and rewind. Random access can require additional processing to quickly identify, decrypt, and decode samples for video, variant, and audio tracks that have a closest PTS to a given timestamp for the playback seek or trick mode. In this regard, unsecured processor 102 and unsecured memory 108 may be able to more quickly access an out of order sample than an arrangement where one secured processor may be used for accessing and decrypting samples. The use of a producer thread and a consumer thread can also allow the consumer thread time to finish processing a current sample while the producer thread prepares the next sample for the consumer thread, which can improve processing during playback seek and trick modes.

In one implementation, when a seek or trick play command is received, the producer thread of processor 102 may attempt to jump to corresponding samples for a video track and a variant track that each have a closest PTS to a timestamp indicated for the playback seek or trick mode. In one example, this can be done by identifying a movie fragment (e.g., a group of samples) for each of the video track and the variant track with a PTS range including the indicated timestamp. Unsecured processor 102 may then determine for each track a fraction of the PTS range for the movie fragment that represents a location of the timestamp, and using the overall number of sample sets for the movie fragment, determine the next video sample and variant sample to process in performing the seek command or trick play.

For example, if a movie fragment includes 40 video samples, unsecured processor 102 may determine, in some cases using rounding, that the given timestamp is located at or approximately at 25% of the total PTS range for an identified movie fragment from the beginning of the PTS range. In this case, processor 102 would read the tenth video and variant samples (in terms of PTS) and store them in sample read buffer 14, since the given timestamp would be a quarter of the way or approximately a quarter of the way into the 40 samples for the movie fragment.

The consumer thread can then process the video and variant samples for decryption and decoding. The consumer thread may also perform synching of an audio sample. By performing the initial identification of samples for random access outside of a secured processor and secured memory, it is ordinarily possible to better conserve these resources for performing decryption and variant sample processing to provide improved playback performance even for seek or trick play modes.

Figure 4:
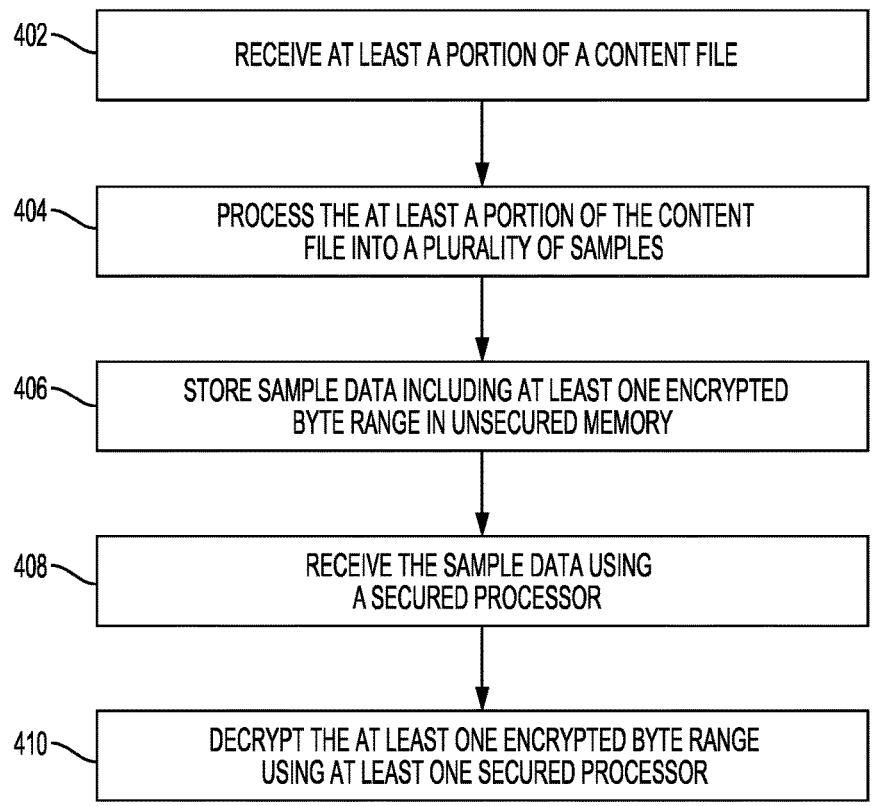
FIG. 4 is a flowchart for a parallel thread process according to an embodiment.

FIG. 4 is a flowchart for a parallel thread process that can be performed by player device 101 according to an embodiment. In the example process of FIG. 4, blocks 402 to 406 may be performed in a producer thread by unsecured processor 102, and blocks 408 and 410 may be performed in a consumer thread by unsecured processor 102 and secured CPU 104, respectively.

In block 402, at least a portion of a content file is received by the producer thread. The content file or portion of the content file is processed in block 404 into a plurality of samples. With reference to FIG. 3 discussed above, the processing of block 404 can include, for example, caching and decompressing the file or file portion, and reading sample metadata and sample data. In block 406, the producer thread stores sample data in an unsecured memory, such as in sample read buffer 14 of unsecured memory 108. The sample data stored in the unsecured memory include at least one encrypted byte range.

In block 408, secured CPU 104 receives the sample data, which may be forwarded from unsecured processor 102 as part of an IPC call. At least one secured processor, such as secured CPU 104, decrypts the at least one encrypted byte range in block 410. Decryption or other processing such as ordering byte ranges of the sample data may be performed by a single secured processor or may be split among multiple secured processors, such as between secured CPU 104 and decoder 106. Examples of such secured processing are discussed below with reference to FIGS. 5 to 7B.

FIG. 5 is an example data flow for the decryption of a video sample with a variant sample according to an embodiment. The decryption and variant processing of FIG. 5 may be performed as part of the consumer thread discussed above for FIGS. 3 and 4. As shown in FIG. 5, the decryption and variant processing of FIG. 5 is arranged in five stages starting with stage 1 in the top box of FIG. 5 and proceeding downward toward stage five in the bottom box of FIG. 5. Stages 1 and 3 are non-secured stages using unsecured memory 108, and stages 2, 4, and 5 are secured stages using secured memories 105 and 107.

Secured CPU 104 receives a video sample (i.e., video sample mdat) and a variant sample (i.e., variant sample mdat) from sample read buffer 14 of unsecured memory 108 via an IPC call. The variant sample includes a first portion with a variant constructor list and a second portion that includes encrypted variant constructors, encrypted byte ranges, and clear-text (i.e., unencrypted) byte ranges.

The encrypted variant constructors are decrypted in secured memory 105 using the variant constructor list and are used to order subsamples or byte ranges of the sample data. The playback map generated by secured CPU 104 is used to determine whether to use the video sample or, if the decryption key with video KID assigned for a given sample is unavailable, to perform variant processing to order and assemble a new variant sample based on information in the variant constructor. In one implementation, secured CPU 104 may process subsamples of byte ranges from the video sample by associating a KID from the playback map for each video sample. When a KID is not found in the playback map for a particular video sample, secured CPU 104 may then use information from the variant constructor to order or assemble a new sample. In one implementation, secured CPU 104 orders or assembles variant byte ranges to generate the new sample.

Secured CPU 104 may also use the playback map to identify double-encrypted byte ranges, such as double-encrypted byte range #1 shown in stage 2 of FIG. 4. The double-encrypted byte range is partially decrypted using a first key (i.e., K(vbrKID1)).

In the example of FIG. 5, secured CPU 104 has determined to use a variant sample in place of a base sample. In stage 2, secured CPU 104 assembles the byte ranges in the order prescribed by the variant constructor as assembled encrypted sample 16 in unsecured memory 108 in stage 3. In the example of FIG. 5, assembled encrypted sample 16 may be in MPEG-CENC format where assembled encrypted sample 16 includes encrypted byte ranges and unencrypted byte ranges following a partial skip/encrypt pattern that spreads the encryption over a slice body of assembled encrypted sample 16.

In this regard, unsecured processor 102 in stage 3 performs further processing for assembled sample 16 in unsecured memory 108. Such further processing can include NAL repacking that may provide unencrypted NAL unit headers and video slice headers per MPEG-CENC that allow decoder 106 to read certain metadata without decryption. In some implementations, the further processing by unsecured processor 102 in stage 3 can include selecting an order for processing samples stored in unsecured memory 108 in response to a user input, such as for a gaming application where an input from a player changes a scene or for seeking or trick play as discussed above, including fast forwarding, rewinding, or jumping to a particular bookmark or chapter. In other implementations, the further processing may include audio processing for an audio track by associating audio data with a sample stored in unsecured memory 108 or adding subtitle data for the sample. In the example of FIG. 5, a KID for a common video key to be used in decrypting assembled encrypted sample 16 (i.e., mediaKID), and an Initialization Vector (IV) (i.e., mediaIV) may also be provided to unsecured memory 108 for decryption (e.g., using AES) in stage 4 by secured CPU 104.

In stage 4, secured CPU 104 receives assembled encrypted sample 16 with the video KID and IV from unsecured memory 108 via an IPC call into secured memory 105. Secured CPU 104 decrypts the encrypted byte ranges of assembled encrypted sample 16 (i.e., encrypted byte ranges #4, #1, and #j) using the common video key associated with the KID retrieved from unsecured memory 108 to produce a decrypted sample.

The decrypted sample is then passed to decoder 106 using a secure audio/video path that allows decoder 106 to access secured memory 105. Decoder 106 decodes the sample in secured memory 107 using, for example, H.265 or H.264. The decoded content is then fed to output interface 112 for display on display device 401.

FIG. 6A is a flowchart for variant processing that can be performed by a secured processor, such as secured CPU 104 according to an embodiment. The process of FIG. 6A may be performed in cases where a variant sample is to be used in place of a base sample. The variant sample may include one or more double-encrypted byte ranges as in the example of FIG. 5, or the variant sample may include only one or more single-encrypted byte ranges without any double-encrypted byte ranges.

In block, 602, the secured processor receives sample data from an unsecured memory, such as unsecured memory 108. The received sample data includes a plurality of byte ranges with at least one byte range being encrypted.

In block 604, the secured processor stores the received plurality of byte ranges in a secured memory, such as secured memory 105. The secured memory may be secured in the sense that access is limited to the secured memory, such as only from the secured processor or through an authentication process.

The plurality of byte ranges is ordered in block 606 by the secured processor. The ordering of the byte ranges may result from a decryption of metadata included in the sample data received in block 602, and/or by using a variant constructor as described above with reference to FIG. 5. In some implementations, the secured processor may additionally or alternatively decrypt some encrypted byte ranges in block 606, while leaving other byte ranges encrypted for storage in unsecured memory 108.

In block 608, the secured processor stores the ordered plurality of byte ranges including one or more of the at least one encrypted byte ranges for further processing of the sample in an unsecured memory, such as unsecured memory 108. With reference to FIG. 2, the ordered plurality of byte ranges may be stored as assembled encrypted sample 16 in unsecured memory 108. Assembled encrypted sample 16 may then be accessed by unsecured processor 102, which may, for example, perform NAL repacking before assembled encrypted sample 16 is forwarded back to secured CPU 104 for decryption of the at least one encrypted byte range using a common video key.

By breaking the ordering and decryption of the sample data, and the NAL repacking into different stages performed by a secured and an unsecured processor, respectively, it is ordinarily possible to improve the performance of playback at high bit rates using less secured processing and memory resources. In this regard, an unsecured memory such as unsecured memory 108 can be used to support a decryption and/or variant sample process without compromising the security of the sample, since at least one byte range of the sample remains encrypted while assembled encrypted sample 16 is stored in unsecured memory 108.

Figure 6B:
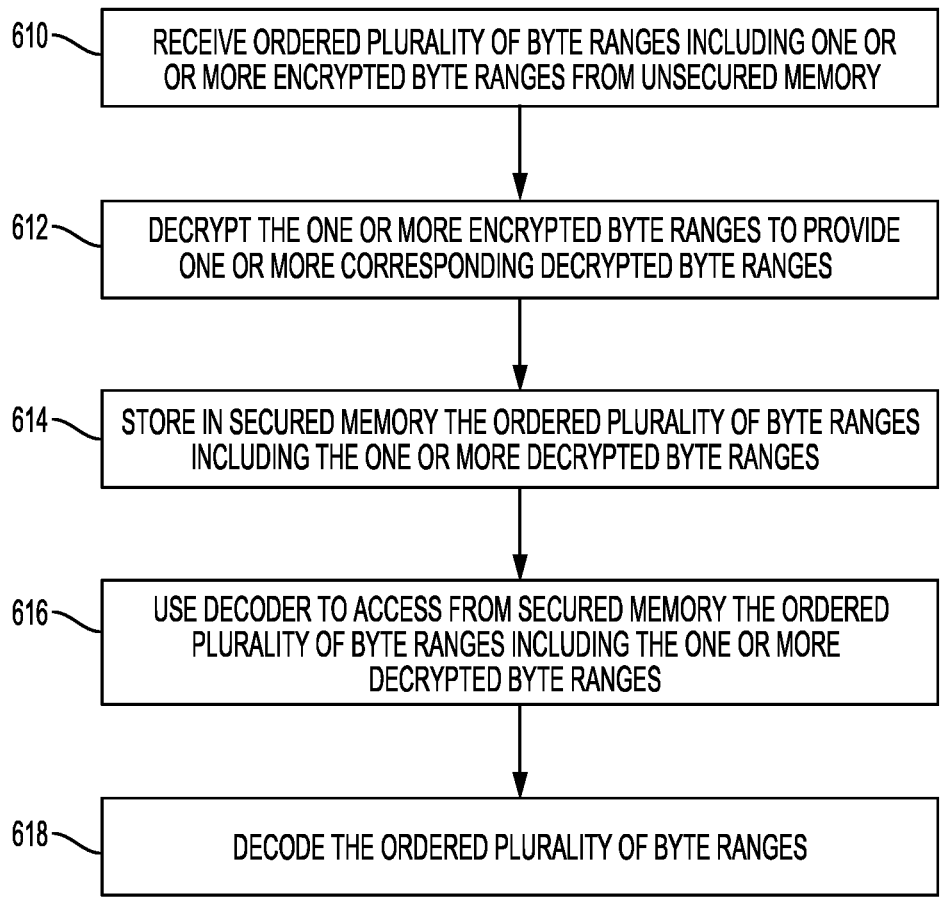
FIG. 6B is a decryption and decoding process according to an embodiment.

FIG. 6B is a decryption and decoding process that can be performed by at least one secured processor, such as CPU 104 and decoder 106 according to an embodiment. The process of FIG. 6B can be performed following the variant processing of FIG. 6A.

In block 610, the secured processor receives an ordered plurality of byte ranges from an unsecured memory, such as unsecured memory 108. The plurality of byte ranges may be received in block 610 as part of an IPC call that forwards the byte ranges to the secured processor. The plurality of byte ranges can form a variant sample that has already been ordered by the secured processor or by another secured processor, and stored in the unsecured memory with one or more byte ranges being encrypted. As discussed above with respect to FIG. 6A, this can ordinarily allow for further processing of the sample by an unsecured processor such as unsecured processor 102 before being completely decrypted by the secured processor.

In block 612, the secured processor decrypts the one or more encrypted byte ranges of the plurality of byte ranges received in block 610. The decryption in block 612 provides one or more decrypted byte ranges that correspond to the one or more encrypted byte ranges. The secured processor can use a secured memory such as memory 105 to perform the decryption using a key that may be available in the secured memory and/or an encrypted key that may be included with the plurality of byte ranges received from the unsecured memory. As shown in the example of stage 4 of FIG. 5 discussed above, the secured processor may receive an encrypted common video key (e.g., mediaKID) for decrypting the one or more encrypted byte ranges using an IV (e.g., mediaIV). In other implementations, the secured processor may decrypt the one or more encrypted byte ranges using only keys or other data available in a secured memory such as secured memory 105.

In block 616, after the plurality of byte ranges have been fully decrypted by the secured processor, a decoder such as decoder 106 accesses the ordered plurality of byte ranges from the secured memory, including the one or more byte ranges decrypted in block 612. The decoder may access the decrypted plurality of byte ranges using an IPC call on a secure audio/video path that allows the decoder to access the secured memory.

In block 618, the decoder decodes the ordered plurality of byte ranges. The decoding may be performed using a secured memory, such as secured memory 107. The decoder may use a standard for decoding the plurality of byte ranges to render content, such as H.265 or H.264. The decoded content is then fed to an output interface of the player device.

Figure 7A:
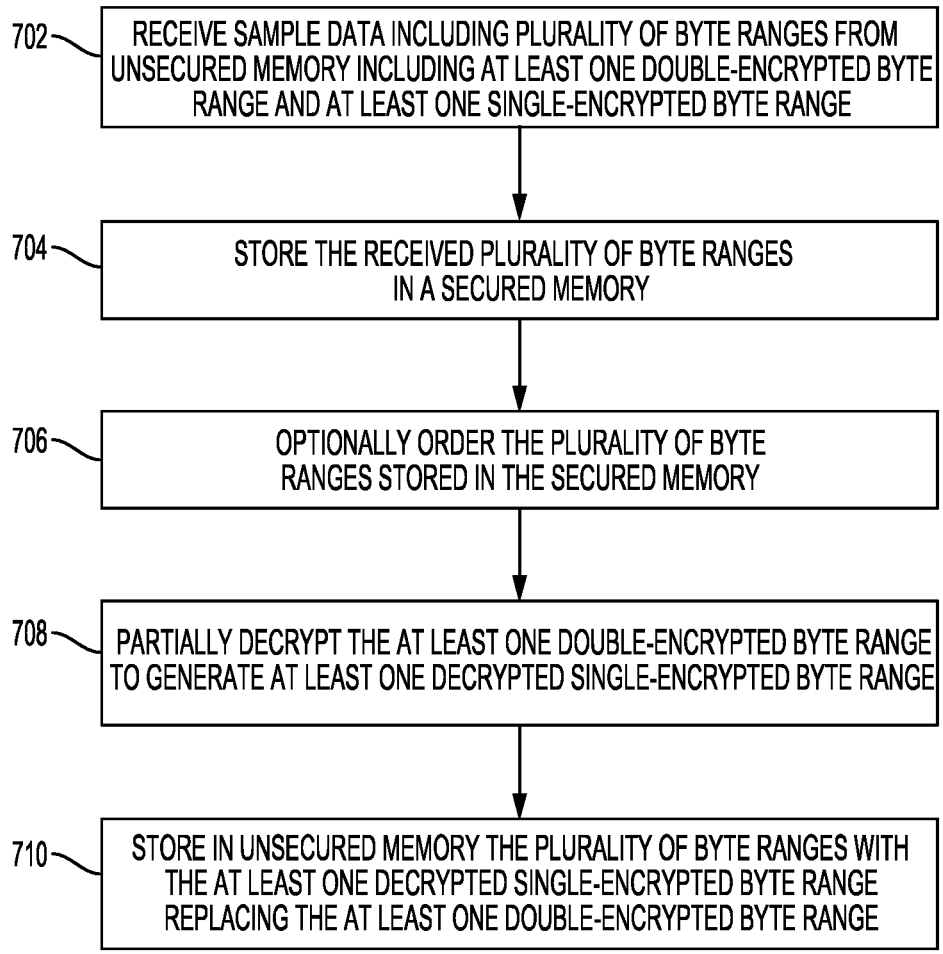
FIG. 7A is a flowchart for a partial decryption process for a sample including a double-encrypted byte range according to an embodiment.

FIG. 7A is a flowchart for a decryption process that can be performed by a secured processor such as secured CPU 104 according to an embodiment. In the example of FIG. 7A, the sample includes at least one double-encrypted byte range and a first secured processor can perform a partial decryption of the at least one double-encrypted byte range. In some implementations, the partial decryption may be performed during a processing stage that may or may not include an ordering as described above for block 606 of FIG. 6A. For example, the process of FIG. 7A may generally correspond to the partial decryption in stage 2 discussed above for FIG. 5. However, those of ordinary skill in the art will appreciate that the process of FIG. 7A may be implemented with different processes than those discussed above for FIGS. 5 and 6A, or without other concurrent processes.

In block 702, the secured processor receives sample data including a plurality of byte ranges or subsamples from an unsecured memory, such as unsecured memory 108. The plurality of byte ranges includes at least one double-encrypted byte range. In some implementations, the plurality of byte ranges may also include at least one single-encrypted byte range in addition to the at least one double-encrypted byte range for additional protection of the sample data.

In block 704, the secured processor stores the received plurality of byte ranges in a secured memory, such as secured memory 105. The secured memory may be secured in the sense that access is limited to the secured memory, such as only from the secured processor or through an authentication process.

In block 706, the secured processor optionally orders the plurality of byte ranges stored in the secured memory. The ordering of the byte ranges may result from a decryption of metadata included in the sample data received in block 702, and/or by using a variant constructor as described above. In this regard, the optional ordering of byte ranges may provide a digital watermark in the content output from the player device.

In block 708, the secured processor partially decrypts or performs a first level of decryption of the at least one double-encrypted byte range to generate at least one decrypted single-encrypted byte range. The partial decryption may be performed with a key associated with the plurality of byte ranges (e.g., K(vbrKID1) in stage 2 of FIG. 5). As discussed above, one or more double-encrypted byte ranges may protect a variant sample that is used to digitally watermark the content. In other cases, the at least one double-encrypted byte range may provide additional security for a base sample, audio data, or other data (e.g., metadata or a key) that is not part of a variant sample.

In block 710, the ordered plurality of byte ranges is stored in an unsecured memory (e.g., unsecured memory 108) using the at least one decrypted single-encrypted byte range in place of the corresponding at least one double-encrypted byte range. The ordered plurality of byte ranges may be stored, for example, as assembled encrypted sample 16 in unsecured memory 108. In some implementations, an unsecured processor, such as unsecured processor 102, may then access the plurality of byte ranges stored in the unsecured memory for further processing before a second stage of decryption.

Figure 7B:
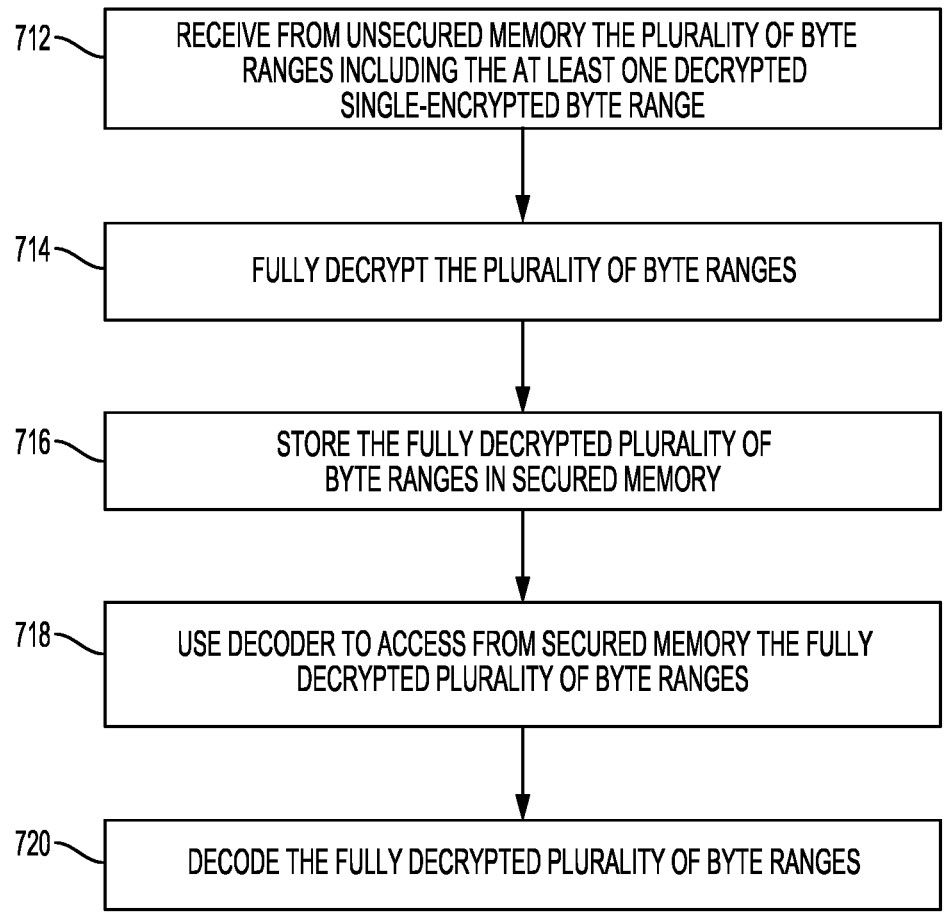
FIG. 7B is a decryption and decoding process for a partially decrypted sample including a decrypted single-encrypted byte range according to an embodiment.

FIG. 7B is a decryption and decoding process for a partially decrypted sample including a decrypted single-encrypted byte range according to an embodiment. The process of FIG. 7B may be performed by a secured processor such as secured CPU 104 or another secured processor after the byte range has been partially decrypted and stored in an unsecured memory, such as unsecured memory 108.

In block 712, the secured processor receives the plurality of byte ranges from the unsecured memory including at least one decrypted single-encrypted byte range. In some cases, the byte range may have been further processed by an unsecured processor (e.g., unsecured processor 102) before the secured processor receives the plurality of byte ranges in block 712. The plurality of byte ranges in some implementations may be forwarded to the secured processor from an unsecured processor using an IPC call.

In block 714, the secured processor fully decrypts the plurality of byte ranges received in block 712. The secured processor may use a secured memory such as secured memory 105 for the decryption. In some implementations, the at least one decrypted single-encrypted byte range may be decoded along with one or more other encrypted byte ranges that were not previously double-encrypted. In such implementations, the secured processor may use a common key (e.g., K(mediaKID) in stage 4 of FIG. 5) for decrypting all of the encrypted byte ranges or may use different keys for decrypting different byte ranges.

In block 716, the secured processor stores the fully decrypted plurality of byte ranges in the secured memory for access by another secured processor, such as decoder 106. In block 718, the decoder accesses the fully decrypted plurality of byte ranges from the secured memory. The access may be performed by using an IPC call on a secure audio/video path so that the decoder can access the fully decrypted plurality of byte ranges in the secured memory.

In block 720, the decoder decodes the fully decrypted plurality of byte ranges. The decoding may be performed in a secure memory, such as secured memory 107, using a standard such as H.265 or H.264. After decoding, the content rendered from decoding the plurality of byte ranges may be provided to an output interface of the player device for outputting the content to a display or other output device.

As described above, breaking the decryption of samples including double-encrypted byte ranges into separate secured stages can ordinarily allow for the use of an unsecured memory during an intermediate processing stage without compromising the security of the encrypted sample. This can help decrease the requirements for secured memory in the player device and may also facilitate the sharing of decryption by different secured processors to improve the speed of decryption and decoding of large encrypted files.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, an SoC, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of computer readable medium known in the art. An exemplary storage medium may be coupled to a processor such that the processor can read information from, and write information to, the storage medium. In the alternative, the storage medium may be integral to the processor. The processor and the storage medium may reside in an ASIC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A player device, comprising:
    an unsecured memory;
    a secured memory; and
    a secured processor configured to:
        receive a plurality of byte ranges from the unsecured memory including at least one double-encrypted byte range and at least one of a single-encrypted byte range and an unencrypted byte range, the plurality of byte ranges forming a sample for content output from the player device;

store the received plurality of byte ranges in the secured memory;

partially decrypt the at least one double-encrypted byte range to generate at least one decrypted single-encrypted byte range; and store in the unsecured memory the plurality of byte ranges using the at least one decrypted single-encrypted byte range in place of the at least one double-encrypted byte range and including the at least one of the single-encrypted byte range and the unencrypted byte range.

2. The player device of claim 1, wherein the secured processor is further configured to order the plurality of byte ranges before storing in the unsecured memory, the plurality of byte ranges including the at least one decrypted single-encrypted byte range.

3. The player device of claim 1, further comprising an unsecured processor configured to perform Network Abstraction Layer (NAL) repacking of the plurality of byte ranges including the at least one decrypted single-encrypted byte range stored in the unsecured memory.

4. The player device of claim 1, wherein the secured processor is further configured to:

receive from the unsecured memory the plurality of byte ranges including the at least one decrypted single-encrypted byte range;

fully decrypt the plurality of byte ranges; and store the fully decrypted plurality of byte ranges in the secured memory.

5. The player device of claim 4, further comprising a decoder configured to:

access from the secured memory the fully decrypted plurality of byte ranges; and decode the fully decrypted plurality of byte ranges.

6. The player device of claim 5, wherein the decoder is further configured to access the fully decrypted plurality of byte ranges from the secured memory using Inter-Process Communication (IPC) on a secure audio/video path.

7. The player device of claim 1, further comprising an unsecured processor configured to execute a producer thread before the secured processor receives the plurality of byte ranges from the unsecured memory, the producer thread including at least one of caching a file received by the player device, decompressing the received file, reading sample metadata from the decompressed file, reading sample data including the plurality of byte ranges from the decompressed file, and storing the sample data in a read buffer of the unsecured memory.

8. The player device of claim 7, wherein the unsecured processor is further configured to execute part of a consumer thread, the consumer thread including obtaining sample data from the read buffer in a particular order for further execution of the consumer thread by the secured processor.

9. A method of operating a player device, the method comprising using a secured processor of the player device for:

receiving a plurality of byte ranges from an unsecured memory of the player device, the plurality of byte ranges including at least one double-encrypted byte range and at least one of a single-encrypted byte range and an unencrypted byte range, and wherein the plurality of byte ranges forms a sample for content output from the player device;

storing the received plurality of byte ranges in a secured memory of the player device;

partially decrypting the at least one double-encrypted byte range to generate at least one decrypted single-encrypted byte range; and storing in the unsecured memory the plurality of byte ranges using the at least one decrypted single-encrypted byte range in place of the at least one double-encrypted byte range and including the at least one of the single-encrypted byte range and the unencrypted byte range.

10. The method of claim 9, further comprising ordering the plurality of byte ranges using the secured processor before storing in the unsecured memory, the plurality of byte ranges including the at least one decrypted single-encrypted byte range.

11. The method of claim 9, further comprising using an unsecured processor of the player device for performing Network Abstraction Layer (NAL) repacking of the plurality of byte ranges including the at least one decrypted single-encrypted byte range stored in the unsecured memory.

12. The method of claim 9, further comprising using the secured processor for:

receiving from the unsecured memory the plurality of byte ranges including the at least one decrypted single-encrypted byte range;

fully decrypting the plurality of byte ranges; and storing the fully decrypted plurality of byte ranges in the secured memory.

13. The method of claim 12, further comprising using a decoder of the player device for:

accessing from the secured memory the fully decrypted plurality of byte ranges; and decoding the fully decrypted plurality of byte ranges.

14. The method of claim 13, wherein the decoder accesses the fully decrypted plurality of byte ranges from the secured memory using Inter-Process Communication (IPC) on a secure audio/video path.

15. The method of claim 9, further comprising using an unsecured processor of the player device for executing a producer thread before the secured processor receives the plurality of byte ranges from the unsecured memory, the producer thread including at least one of caching a file received by the player device, decompressing the received file, reading sample metadata from the decompressed file, reading sample data including the plurality of byte ranges from the decompressed file, and storing the sample data in a read buffer of the unsecured memory.

16. The method of claim 15, further comprising using the unsecured processor for executing part of a consumer thread, the consumer thread including obtaining sample data from the read buffer in a particular order for further execution of the consumer thread by the secured processor.

17. A player device, comprising:

an unsecured memory;

a secured memory; and means for:

receiving a plurality of byte ranges from the unsecured memory including at least one double-encrypted byte range and at least one of a single-encrypted byte range and an unencrypted byte range, the plurality of byte ranges forming a sample for content output from the player device;

storing the received plurality of byte ranges in the secured memory;

partially decrypting the at least one double-encrypted byte range to generate at least one decrypted single-encrypted byte range; and storing in the unsecured memory the plurality of byte ranges using the at least one decrypted single-encrypted byte range in place of the at least one double-encrypted byte range and including the at least one of the single-encrypted byte range and the unencrypted byte range.

18. The player device of claim 17, further comprising means for ordering the plurality of byte ranges before storing in the unsecured memory, the plurality of byte ranges including the at least one decrypted single-encrypted byte range.

19. The player device of claim 17, further comprising an unsecured processor configured to perform Network Abstraction Layer (NAL) repacking of the plurality of byte ranges including the at least one decrypted single-encrypted byte range stored in the unsecured memory.

20. The player device of claim 17, further comprising means for:
receiving from the unsecured memory the plurality of byte ranges including the at least one decrypted single-encrypted byte range;
fully decrypting the plurality of byte ranges; and
storing the fully decrypted plurality of byte ranges in the secured memory.

\* \* \* \* \*